Patented Sept. 15, 1953

2,652,322

UNITED STATES PATENT OFFICE 2,652,322

HERBICIDES

Ross M. Hedrick and David T. Mowry, Dayton, Ohio, assignors to Monsanto Chemical Company, St. Louis, Mo., a corporation of Delaware No Drawing. Application January 3, 1951, Serial No. 204,258

4 Claims. (Cl. 71—2.7)

This invention relates to compositions of matter unusually adapted for the destruction of vegetation. More particularly, the compositions have unusual properties for preventing various undesirable secondary effects, which frequently occur when ordinary herbicidal compositions are used to destroy growing surface plants.

The use of herbicides of both contact and hormone types to treat undesired vegetation is well-known and widely practiced. Roadsides, embankments, and other earth surfaces are often subjected to toxic chemicals to prevent brush growth which may become a fire hazard if permitted to accumulate. Similarly, railroad rights of ways may be improved in appearance by controlling plant growth by the action of herbicides. Fire lanes cut in timber land often do more harm than good if surface brush, which grows more abundantly in cleared areas, is permitted. In these several applications herbicides have proved to be of exceptional value.

Herbicides of the conventional type frequently induce undesirable secondary effects due to the tendency to encourage wind and water erosion. Areas cleared of the normal covering vegetation are more susceptible to the washing by surface water than are areas where vegetation is permitted to grow. The roots of growing plants and the leaf mulch serve to retain the soil particles in their original position. The excessive drying of the soil is avoided and the soil is retained in a moist compacted form, stable to movement by the wind, but the destruction of plants removes the stabilizing attributes. These disadvantages are especially noticeable on lands with sloped surfaces, for example artificial embankments and the surfaces of cuts through hillsides and ridges. Most of the remaining timber is found in hilly country where the use of herbicides to remove fire hazards causes serious washing and loss of top soils and the natural land contours. Similarly road embankments and shoulders in wooded, hilly country, where it is impracticable to seed grass and maintain fire lanes by regular mowing, present serious fire hazards where herbicides are not used, yet the destruction of vegetation will result in intolerable erosion.

The purpose of this invention is to provide a herbicidal composition which will not cause excessive erosion. A further purpose of this invention is to provide methods of destroying surface vegetation without inducing injury to the physical structure of the underlying soil. A still further purpose of this invention is to improve the physical characteristics of soil so that herbicides may be used without disadvantageous erosion effects.

In accordance with this invention it has been found that if conventional herbicides are dispersed in certain polymeric carriers, or water solutions thereof, vegetation may be destroyed without permitting the breakdown of the natural crumb structure of the soil. If the vegetation to be destroyed is growing on sub-soil or other soils of poor structure, the desirable porous crumb structure may actually be developed by the use of the new herbicidal compositions. The said water-soluble polymeric carriers are deposited on the plant surface or on the soil surface. The type of toxicant used in combination with the polymeric carriers will influence the manner of application. If the new herbicides are applied to the leaves, they will ultimately reach the ground through the washing action of rainfall. However they are applied, the polymeric carriers will ultimately become adsorbed to the soil particles and cause the agglomeration thereof into discreet crumbs, which produce the improved physical properties of the soil. The agglomeration of the very fine soil particles into larger particles minimizes the movement of the soil by the action of flowing surface water or windstorms. The same improved soil structure enables the soil to absorb larger proportions of moisture and to retain the moisture for a longer period of time through the minimization of surface evaporation. Soils of improved structure are more readily penetrated by rainfall or other moisture on the surface of the soil whereby the flow of water on the surface in confined channels is eliminated or substantially minimized. The combined effect of all these properties is to avoid the removal of soil from its normal position by action of wind or water.

In the culturing of certain crops the use of selective herbicides to effect weed control is widely used in preference to mechanical cultivation by disks, harrows and the like. By this technique considerable economies in weed control may be effected without direct chemical damage to the crop. However, with soils of poor structure, the impact of rainfall causes slaking of the soil, erosion, severe cracking and the formation of a hard surface crust. In these cases mechanical cultivation during the growing season also serves to break up this surface crust, which provides a dry surface mulch, reduces evaporation of water and increases aeration in the underlying soil. Although shallow feeder roots are frequently destroyed by mechanical cultivation, yields of corn are nevertheless substantially greater in soils of poor structure where mechanical control of weeds is used in contrast to control by chemical herbicides.

In the practice of the present invention, the desirable effects of soil structure improvement which are accomplished to some degree by mechanical cultivation are much more effectively accomplished by the use of the structure improving additives. These effects are more completely described in our copending application, Serial No. 197,825, filed November 27, 1950. Hence substantially better yields are achieved when weed control is effected by a mixture of a selective herbicide and the structure improving additive than are achieved either by the use of cultivation or the herbicide alone.

The polymeric carrier for the herbicidal composition is a water-soluble polymer or copolymer of an acrylic or methacrylic acid derivative. Suitable polymers are those containing numerous recurring molecular units indicated by the structural formula:

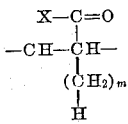

wherein X is a solubilizing radical of the group consisting of —OK, —ONa, —ONH₄, —ONRH₃, —ONR₂H₂, —ONR₃H, —ONR₄, —OH, —NH₂, —OCH₂NR₂, —OCH₂CH₂NR₂, —NHR and —NR₂, wherein R is an alkyl radical having up to four carbon atoms, and m is a small whole number from zero (0) to one (1) inclusive. Of particular value are the homopolymers containing numerous identical groups of the class described above. Also of value are the copolymers containing two or more kinds of the described groups. The copolymeric type may have in addition to the numerous water-soluble groups minor amounts of other groups derived from polymerizable monomers, such as styrene, vinyl acetate, acrylonitrile, methacrylonitrile, butadiene, the alkyl methacrylates, the alkyl acrylates, vinylidene chloride, vinyl chloride, the alkyl maleates, the alkyl fumarates, α-methylstyrene, and other olefinic compounds capable of polymerization with the various acrylates described above. In general, the polymers must contain sufficient of the solubilizing groups to render then soluble in water and to impart a hydrophilic character to the soil particles.

The compounds useful in the practice of this invention may be regarded as water-soluble polymers of acrylic and methacrylic acid derivatives, including acrylic acid, methacrylic acid, acryl amide, methacrylamide, the alkali metal, amine, and ammonium salts of either acrylic or methacrylic acid, β-aminoethyl acrylate, β-aminoethyl methacrylate, β-methyl aminoethyl acrylate, β-methyl aminoethyl methacrylate, N,N-dimethyl-β-aminoethyl methacrylate, and the N-alkyl substituted acrylamide and methacrylamides.

Suitable herbicides for use in combination with the polymers for the preparation of the new herbicidal compositions are 2,4-dichlorophenoxyacetic acid and the metal salts, amino salts and esters thereof, the corresponding derivatives of 2,4,5-trichlorophenoxyacetic acid, trichloroacetic acid, the various aromatic derivatives of carbamic acid, for example, isopropyl-N-phenyl carbamate, pentachlorophenol and the soluble salts, such as sodium pentachlorophenate, arsenic derivatives, such as sodium arsenate, sodium chlorate, ammonium sulfamate, dinitrophenol and other aromatic nitro derivatives, and other compounds known to be toxic to living plant tissues.

The relative proportions of each of the components will depend upon the type of vegetation and the extent of growth to be destroyed, and also upon the specific herbicides used and their relative toxicity. Furthermore, the quantity of carrier used will also be influenced by the need of the soil for structural improvement, the need for an adhesive to prolong contact with the above-ground parts of the plants and to increase the period of effectiveness of the specific herbicide in contact with the ground. In general from 0.05 per cent to 20 per cent by weight of herbicide and from 80 per cent to 99.95 per cent of the polymer will be effective. Preferred practice utilizes from 0.1 to 10.0 per cent by weight of herbicide and from 90 per cent to 99.95 per cent of the polymer.

The polymer and herbicide do not merely produce their individual effects simultaneously, but there is a complementary or synergistic effect. The polymers under some circumstances adsorb or occlude the herbicide and thereby retain it in effective form for a longer period by preventing its dissipation by rainfall or destructive action of soil bacteria.

Other benefits will obviously be derived by the proper selection of the specific herbicides and specific polymers which form base chemical compounds capable of dissociation in the soil over a substantial period of time.

What we claim is:

1. A solid composition comprising from 0.05 to 20 per cent by weight of a herbicide and from 80 to 99.95 per cent of a carrier consisting of a water-soluble polymer of the compound having the structural formula

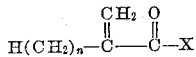

wherein n is an integer from zero (0) to one (1), inclusive, and X is a radical of the group consisting of —OK, ONa, —ONH₄, —ONRH₃, —ONR₂H₂, —ONR₃H, —OH, —NH₂, —OCH₂NR₂,

—OCH₂CH₂NR₂, —NCH₂CH₂NHR

—NCH₂CH₂NR₂, —NHR, and NR₂ wherein R is an alkyl radical having up to four carbon atoms, said polymer having a structure derived substantially entirely by the polymerization of a mono-olefinic compound.

2. The herbicidal composition as defined by claim 1 wherein from 0.1 per cent to 10.0 per cent by weight of the composition is herbicide.

3. A solid composition comprising a herbicide and a water-soluble polyelectrolyte having a molecular structure derived essentially by the polymerization of a mono-olefinic compound through aliphatic unsaturated groups, said polyelectrolyte being a polymer of at least one compound containing the molecular grouping

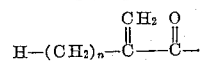

and having the property of imparting water stability to soil aggregates.

4. The composiiton defined by claim 3 wherein from 0.05 to 20% by weight of the composition is a herbicide.

ROSS M. HEDRICK.
DAVID T. MOWRY.

References Cited in the file of this patent

UNITED STATES PATENTS

| Number | Name | Date |
|---|---|---|
| 1,976,679 | Fikentscher et al. | Oct. 9, 1934 |
| 2,380,416 | Davidson | July 31, 1945 |
| 2,556,451 | Smith | June 12, 1951 |
| 2,582,194 | Dudley | Jan. 8, 1952 |

FOREIGN PATENTS

| Number | Country | Date |
|---|---|---|
| 592,670 | Great Britain | Sept. 25, 1947 |